March 9, 1943.   J. C. ARNOLD   2,313,310
WELLBORE RADIATION LOGGING APPARATUS
Filed Aug. 4, 1940   3 Sheets-Sheet 1
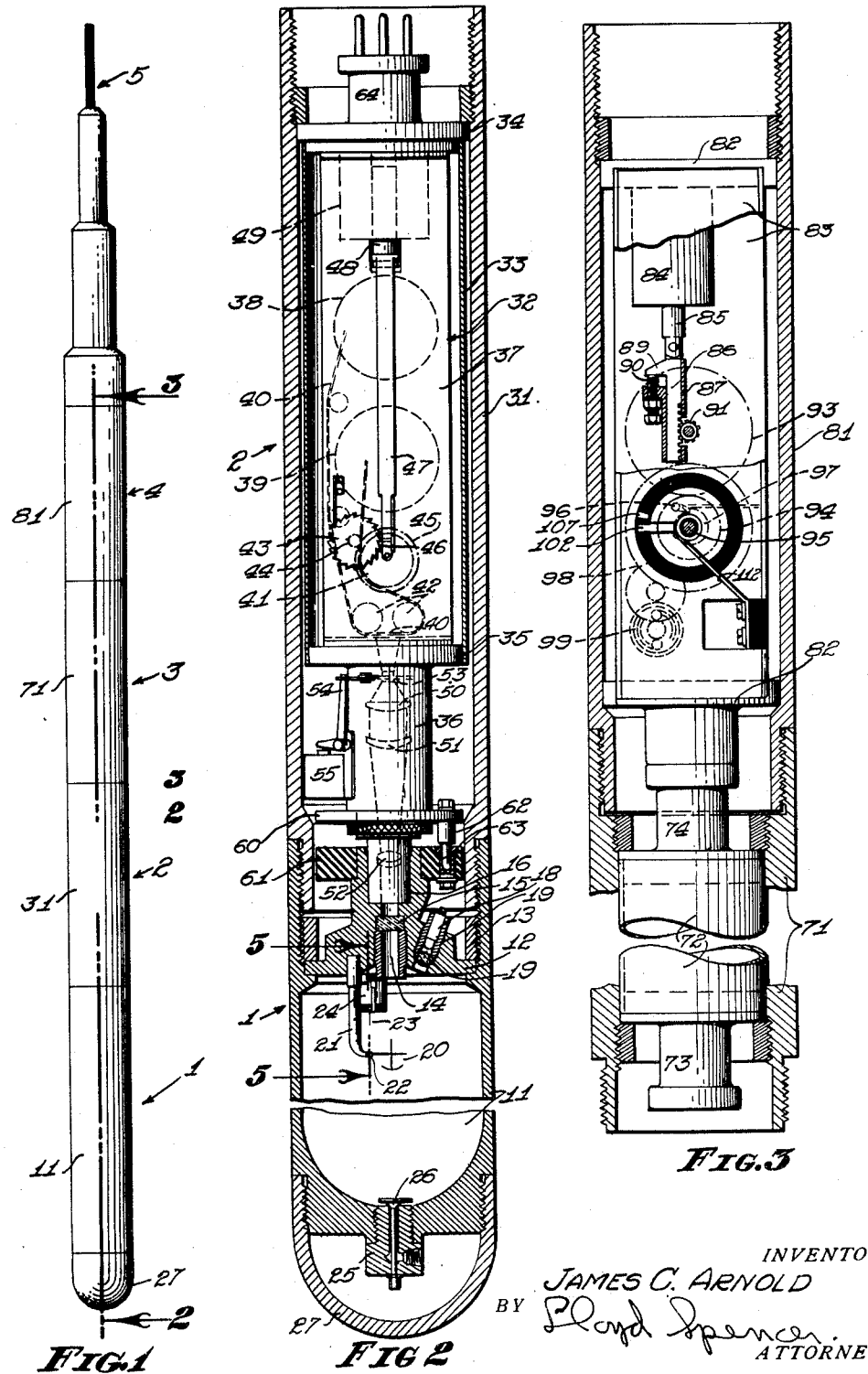
INVENTOR
JAMES C. ARNOLD
BY Lloyd Spencer
ATTORNEY March 9, 1943.   J. C. ARNOLD   2,313,310
WELLBORE RADIATION LOGGING APPARATUS
Filed Aug. 4, 1940   3 Sheets-Sheet 2
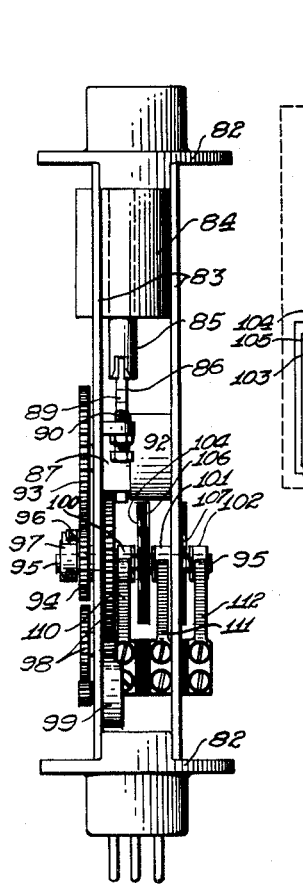
INVENTOR
JAMES C. ARNOLD
BY Lloyd Spencer
ATTORNEY March 9, 1943. J. C. ARNOLD 2,313,310
WELLBORE RADIATION LOGGING APPARATUS
Filed Aug. 4, 1940 3 Sheets-Sheet 3

INVENTOR
JAMES C. ARNOLD
BY Lloyd Spencer
ATTORNEY

Patented Mar. 9, 1943

2,313,310

UNITED STATES PATENT OFFICE 2,313,310

WELL-BORE RADIATION LOGGING APPARATUS

James C. Arnold, Los Angeles, Calif., assignor to Lane-Wells Company, Los Angeles, Calif., a corporation of Delaware Application August 4, 1940, Serial No. 351,283

19 Claims. (Cl. 250—83.6)

My invention relates to wellbore radiation logging apparatus, that is, to apparatus adapted to be lowered within a wellbore, whether cased or uncased, to measure radiations from the surrounding formation, or the effects of radiation, or of any manner of sub-atomic bombardment, particularly radiation or bombardment capable of penetrating a casing. Among the objects of my invention are:

First, to provide a wellbore radiation logging apparatus which is a self-contained unit, that is, the detecting means and the recording means are combined in a housing adapted to be lowered as a unit within the wellbore so that the effect of radiation from the formation need not be transmitted to the surface, thereby eliminating expensive cable, delicate amplifying mechanism and costly surface equipment;

Second, to provide a wellbore radiation logging apparatus which employs a device such as an electroscope in which sensitive elements are caused to move physically in response to primary or secondary radiations from the formation, such movement being enlarged optically and recorded photographically;

Third, to provide a logging apparatus which employs an electroscope or similar extremely simple means of detection, the movement of which is capable of direct recordation without the employment of amplifiers or other apparatus requiring delicate adjustment or affected by changes in temperature when the apparatus is lowered into a wellbore, thereby providing an apparatus which is extremely simple of construction and substantially unaffected by ordinary temperature changes;

Fourth, to provide a logging apparatus which may be electrically controlled from the surface through a single conductor cable, the apparatus incorporating a novel means of control whereby variations in the resistance of the cable do not affect the operation of the apparatus, the control also being so arranged that successful operation of the apparatus is indicated at the surface and, furthermore, the record made within the apparatus may be correlated with movement of the cable hoist so that the resulting record may be interpreted in terms of well depth for the purpose of identifying the strata or otherwise interpreting the record;

Fifth, to provide an apparatus of this character which, although primarily designed to record gamma ray emanations, is equally capable of recording any type of radiation, or sub-atomic bombardment, that either directly or indirectly produces ionization effects capable of affecting the charge of an electroscope;

Sixth, to provide an apparatus of this character in which, by controlling the rate at which the apparatus is moved past the formation, the amplitude of the record obtained may be controlled, thus by relatively rapid movement of the apparatus throughout the zone to be investigated a preliminary chart may be obtained and studied; therefore, more detailed records, or records of greater amplitude, may be obtained to give additional information concerning the desired sections of the zone being investigated, both types of records being obtained with only minor or nominal adjustment of the apparatus; and Seventh, to provide a logging apparatus which may be used in conjunction with an artificial source of radiation, that is, to measure secondary radiation resulting from the treatment of a formation with an artificial source of primary radiation such as disclosed in the Bender Patent No. 2,133,776.

With the above and other objects in view, as may appear hereinafter, reference is directed to the accompanying drawings, in which:

Figure 1 is an elevational view of my apparatus;

Figure 2 is a longitudinal sectional view thereof, taken through 2—2 of Figure 1, showing particularly the electroscope, microscope and camera mechanism;

Figure 3 is another longitudinal sectional view continuing from Figure 2 and showing particularly the battery compartment and operation selector;

Figure 4 is an elevational view taken at right angles to Figure 3, showing the operation selector removed from its case;

Figure 5 is a fragmentary sectional view through 5—5 of Figure 2 showing the electroscope charging device;

Figure 6 is a bottom view of the electroscope charging device taken substantially along the line 6—6 of Figure 5;

Figure 7 is a diagrammatical view of the apparatus lowered within a wellbore;

Figure 8 is a diagrammatical view of the surface control means for the apparatus;

Figure 9:
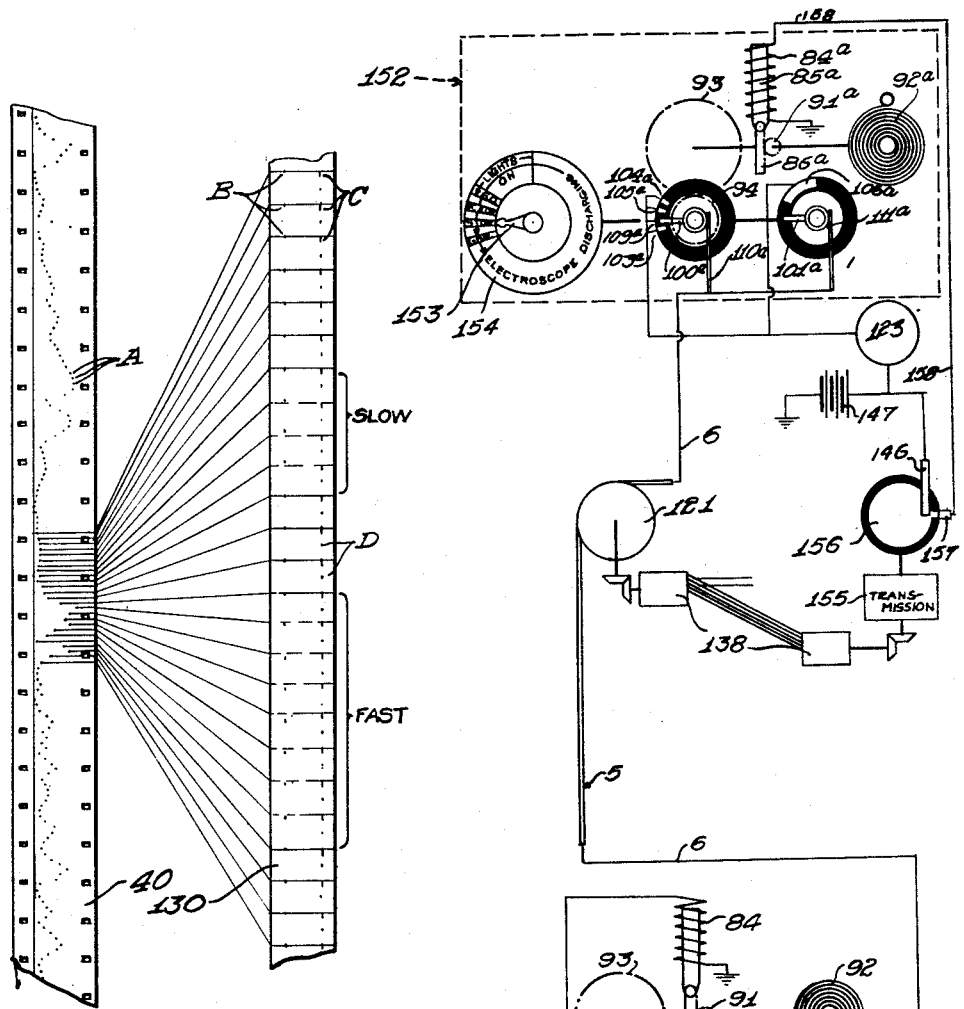
Figure 9 is a view of the records obtained by the apparatus and by the surface equipment for correlation to determine the depth.

My invention consists essentially of an electroscope 1, camera 2, battery compartment 3 and operation selector 4 which are adapted to be assembled as a unit and lowered within a wellbore on a cable 5, preferably having a single conductor 6. At the surface control means (indicated generally by 7) are provided which function through the conductor of the cable to control the operation of the electroscope and associated devices.

It is contemplated that the electroscope, camera, battery compartment and operation selector (which may be referred to generally as a detector) be lowered within a cased or uncased wellbore for the purpose of detecting and recording selected radiations or emanations, for example, gamma ray. By adaptation, the electroscope may be caused to detect neutrons or other sub-atomic particles which, in a strict sense, may not be radiations.

Reference is first directed to the electroscope, shown particularly in Figures 2 and 7. The electroscope includes a cylinder 11 of sufficiently heavy walls to withstand internal pressure and which forms an ionization chamber. The upper end of the cylinder is internally threaded and provided with a shoulder upon which is seated a partition 12, held in place by screw-threaded rings 13.

The partition 12 is provided with a centrally disposed viewing aperture 14 in which is mounted a transparent window 15 adapted to withstand extreme pressure. The outer end of the viewing aperture 14 is enlarged to form a microscope-receiving socket 16 adapted to receive a microscope, which will be described hereinafter. Arranged around the viewing aperture 14 is a ring of light sockets 17 formed within the partition 12. Combined sealing and focusing lenses 19 are mounted in each of the light sockets 17. Outwardly from the focusing lens the sockets receive lighting elements 18 in the form of small electric light bulbs. The several lenses 19 focus upon an electroscope element 20 mounted within the cylinder 11. The electroscope element is preferably the type known as the "Neher" such as described in "Procedures in Experimental Physics" by Dr. John Strong, page 230. The electroscope element 20 is mounted on a suitable mounting post 21 supported from the partition 12.

The electroscope element consists essentially of a quartz filature supported by a right-angularly disposed torsion spring likewise formed of fused quartz, the ends of the spring being supported by a framework. Inasmuch as the quartz filature and torsion springs are only a few microns in in diameter, the framework only is shown and this substantially diagrammatical inasmuch as the electroscope is in itself of conventional design. The quartz filature is given a high voltage charge to move it away from a part of the framework, the filature tending to move toward the framework as the charge is dissipated.

In my apparatus an indicator end of the quartz filature is magnified and recorded on a film to indicate the amount of movement or variation in the amount of movement caused by leakage of the static charge. Such leakage is caused by the sub-atomic bombardment of the atmosphere contained within the chamber with various radiations such as gamma rays. Also, in accordance with conventional practice in electroscope design, a discharge may be caused by a secondary emanation from a coating on the interior of the chamber, which coating is affected by selected radiation or by neutron bombardment.

In order to charge the electroscope a small metallic band 22 is provided on the mounting post 21 adjacent the framework of the electroscope element. This band is adapted to be contacted by a small wire or whisker 23. The whisker is suitably journaled for movement toward and away from the band 22, normally occupying a position clear of the band. A magnet 24 is mounted within the chamber in such a manner as to actuate the whisker. Suitable leads extend from the magnet and from the whisker through the partition 12. The construction of the magnet and whisker is shown best in Figures 5 and 6.

At the lower end of the cylinder 11 there is screw-threaded a valve body 25 in which is mounted a valve 26 arranged so that it may be loosened or tightened from the outer side of the valve body. A passageway controlled by the valve leads to the exterior of the cylinder and is provided with suitable means for connection to a source of gas under pressure.

The sensitivity of the electroscope is increased by the increased gas pressure within the cylinder or ionization chamber 11. Consequently, gas under extremely high pressure may be introduced. The gas is, of course, one of the inert gases, preferably argon or krypton. A suitable sealing cap 27 is fitted over the lower end of the cylinder so as to encompass the valve body.

Reference is now directed to the camera, particularly in Figures 2 and 7. The camera is contained within a housing 31, the lower end of which is adapted to screw into the upper end of the electroscope cylinder 11. The housing is cylindrical and of substantially uniform diameter. Within the housing is fitted a film transport case 32 comprising a tubular shell 33, the ends of which are covered by upper and lower end members 34 and 35, respectively. The lower end member has a depending extension which forms a microscope tube 36; the lower end of the microscope tube fits within the socket 16 of the partition 12. This construction will be described in more detail hereinafter.

Between the upper and lower end members there is provided a pair of frame members 37 in the form of parallel disposed plates between which is mounted a pair of film reels 38 and 39. The strip of film 40, which may be conventional, is wound from one reel onto the other, being driven by a drive sprocket 41. A pair of guide rollers 42 position the film over the microscope tube.

The drive sprocket 41 is actuated by a ratchet 43 through gears 44 and 45. The ratchet is adapted to be engaged by a pawl 46 which is connected to a pawl arm 47 extending along the side of one of the frame members to the upper end of the case, where it is attached to an armature 48 adapted to fit within a solenoid 49. Suitable drive means is provided between the driving sprocket and the reel upon which the film winds so that with each movement of the solenoid armature the film may be advanced a predetermined amount. In the present case the amount of movement is extremely small and need not be greater than a twenty-fifth of an inch so that twenty-five records, more or less, may be photographed on ach inch of film, as will be described hereinafter.

The microscope tube 36 is provided with microscopic lenses 51 and 52 so as to focus on the quartz filature of the electroscope element 20.

The direction of movement of the quartz filature is such that it moves across the film rather than longitudinally. At a suitable point within the microscope tube there is provided a shutter 53 which is operated by a shutter lever 54 in turn controlled by a magnet 55 mounted on the side of the microscope 2.

It is preferred, in order to facilitate assembly of the various parts, that each section be completely wired as a unit so that they may be readily fitted together and the various electric circuits automatically completed. For simplicity the wiring is not shown in Figures 2 and 3, but is limited to the diagrammatical view in Figure 7. The necessary leads (not shown in Figure 2) for the charging whisker 23, the charging magnet 24 and the light 18 are carried by or within the camera housing. Around the microscope tube may be provided a terminal ring 60 which coacts with a terminal ring 62 carried by the partition 12, the terminal rings having coacting terminal elements 62 and 63. The upper end of the camera housing may be fitted with a multiple contact terminal 64.

Above the camera housing 31 is a battery housing 71 which is screw-threaded into the camera housing and which contains a battery case 72. The battery case is provided with multiple contact terminal units 73 and 74 at its lower and upper ends, respectively, and contains an electroscope charging battery 75, a light supply battery 76 and magnet supply battery 77, shown diagrammatically in Figure 7.

Screw-threaded into the upper end of the battery housing 71 is an operation selector housing 81. The operation selector is designed to control a sequence of operations in the apparatus and comprises a pair of end members 82 which are joined by frame members 83 in the form of parallel-disposed plates which extend longitudinally within the housing. Between their upper ends there is mounted a solenoid 84 which actuates an armature 85 adapted to move a ratchet 86. The ratchet 86 fits within a ratcheted guide 87. The ratchet is provided with a stop lug 89 and the guide with a set screw 90 for the purpose of adjusting the movement of the ratchet.

The ratchet actuates a drive pinion 91 for movement in one direction, while a spring motor 92 connected to the shaft of the ratchet drive pinion rotates the pinion in opposition to the ratchet member. The ratchet shaft drives through gears 93 and 94 to a sweeper arm shaft 95. On the gear 94 there is provided a pawl 96 which engages a ratchet wheel 97 (preferably with a single tooth) which is secured to the sweeper arm shaft. The ratchet and spring motor are so related that the sweeper arm shaft is rotated through the medium of the pawl and ratchet when turned in the direction urged by the spring motor, but does not rotate the sweeper arm shaft when the ratchet operates to wind the spring motor. Thus the sweeper arm is moved in one direction only. The adjustment of the stop means and the length of travel of the ratchet is such that the sweeper arm shaft makes a single complete operation each time the solenoid armature is actuated and released. In order to control the rate at which the sweeper arm shaft rotates under the urge of the spring motor 92 there is provided a governor gear train 98 which drives a suitable governor 99.

Mounted upon the sweeper armshaft 95 are sweeper arms 100, 101 and 102. The sweeper arm 100 engages, immediately after the beginning of its cycle of operation, a charging magnet contact 103; then, near the end of its cycle of operation, engages a shutter magnet contact 104 and a film transport control solenoid contact 105. During rotation of the sweeper arms, sweeper arm 101 engages at an appropriate interval, a light contact 106. Similarly, sweeper arm 102 engages, just before completion of its cycle of operation, a ground contact 107 which is connected through a resistor 108 to ground, and upon termination of its cycle of rotation stops upon the operation selector solenoid contact 109.

The sweeper arms 100, 101 and 102 are engaged by brushes 110, 111 and 112, respectively. The brush 110 is connected to battery 77; the brush 111 to battery 76, while the brush 112 is connected to the conductor 6 of the cable 5.

Reference is now directed to the surface equipment which controls the electroscope and associated mechanism, such equipment being designated generally by 7 and shown diagrammatically in Figure 8. The cable 5 passes over a sheave wheel 121 to a suitable hoist (not shown). The hoist is conventional and is preferably so arranged that the cable may be moved at a substantially uniform speed and a speed capable of regulation within rather close limits.

The conductor of the cable is connected to a timer drum terminal 122 and through a meter 123 to an operation indicating drum terminal 124. The terminals 122 and 124 coact with drums 125 and 126, having contacts 127 and 128, respectively, thereon and driven by a timer motor 129 which is preferably a constant speed motor.

The timer motor actuates a synchronism indicating tape 130 through suitable driving means 131. A magnet 132 actuates a tape marker 133 and the magnet is connected by a lead 134 to a terminal 135 associated with a tape marker control drum 136 mounted on the same shaft with the timer drum 125 and the operating indicating drum 126. The tape marker drum 126 is provided with a contact 137 which closes the circuit to the magnet 132 at the same time the contact 127 closes the circuit to the conductor 6.

The sheave wheel 121 operates through a "Selsyn" drive 138 a suitable depth indicating device such as a counter (not shown). Either associated with such counter or driven independently therefrom is a depth marker drum 139 having contacts 140 and 141 thereon. The contacts 140 and 141 engage a terminal 142 which is connected by a lead 143 to a magnet 144, which controls a tape marker 145. Brushes 146 engage the several drums and are connected with a battery 147.

Operation of my wellbore radiation logging apparatus is as follows: The timer motor is adapted, for example, to rotate the timer drum, one rotation per five seconds. The operation selector is so adjusted that the sweeper arms rotate in response to the spring motor; for example, one rotation in five seconds. Thus when a circuit is completed through the solenoid 84, contact 109, sweeper arm 102, brush 112, cable conductor 6, terminal 122, contact 127 and battery 147 the solenoid 84 is energized, causing the spring motor to be wound one rotation. As long as the circuit is completed the sweeper arms do not begin their cycle of operation. When the contact 127 breaks connection with the terminal 122 the circuit is opened so that the spring motor is free to rotate the sweeper arms. The sweeper arms, in the course of their cycle of rotation, accomplish the following operations:

I. Sweeper arm 100 engages the charging magnet contact 103 which causes the charging magnet to move the whisker 23 against the charging band 22 to charge the electroscope. As soon as the electroscope is charged and the whisker disengaged the electroscope starts to discharge at a rate dependent upon the bombardment of radiations or the like, which may cause ionization within the chamber and a leakage of the charge given the electroscope.

II. Sweeper arm 101 closes the circuit through the lights 83.

III. Sweeper arm 100 engages the shutter magnet contact to actuate the shutter 53, it being noted that a predetermined interval has elapsed between the charging of the electroscope and the operation of the shutter.

IV. The sweeper arm 102 engages the contact 107 and simultaneously therewith the circuit is completed through the meter 123 to give an indication that the operation selector has almost moved through its cycle of operation.

V. Sometime during the cycle of operation, which may be simultaneous with operation IV, the sweeper arm 100 closes the circuit through the film transport control solenoid contact 105, so as to shift the film into a new position in readiness for the next record.

VI. The sweeper arms come to rest with the sweeper arm 103 on engaging the operation selector solenoid contact 109 and simultaneously therewith the timer through termial 122 and contact 127 again complete the circuit through the operation selector solenoid 84, so that the cycle of operation may be repeated.

Assuming that the cycle of operation takes place in five seconds, and assuming that the cable is moved at a uniform rate of five feet per five seconds, the record obtained would indicate the average bombardment for a five-foot section of the wellbore. If the cable speed were slower, say, one foot per five seconds, the record would be the average for one foot of wellbore. Change in the period selected, such as increasing the period from five seconds to ten seconds, has the effect of increasing the sensitivity of the apparatus.

Reference is directed particularly to Figure 9 in which is illustrated a section of the film 40. On the film are indicated a series of dots A which represent a series of pictures taken of the quartz filature, that is, the indicating end of the quartz filature of the electroscope element. If the movement of the apparatus along the borehole has been uniform then the spacing between the series of dots A may be scaled to depth, that is, assuming that the cycle of operation is five seconds and that the cable is moved one foot per second, the spacing between the dots A represents five feet of wellbore; if the speed were one foot per five seconds the spacing would be one foot between each dot. In order to aid in translating the distance between the dots A on the film 40 in terms of well depth footage, and also to aid in maintaining a constant speed, the synchronism indicating tape 130 is employed. As described hereinbefore, the tape 130 moves at a uniform speed, once for each cycle of operation; for example, each five seconds a mark B is made by the marker 133 associated with the timer drum; also once for each preselected distance of travel, for example, five feet, the marker 145 associated with the sheave wheel makes a mark C. If the marks B and C are made simultaneously and are therefore in line with each other the cable is traveling at a preselected uniform speed, as shown in Figure 9; departure from alignment of the two markings B and C indicate either that the cable is moving too fast or too slow. The operator may, by noting the relative timing of the markers, speed up or slow down the hoist so as to keep them in synchronism. Slight deviations, if corrected, are not cumulative and do not introduce appreciable error in the record on the film 40, but in the event of major error correction of the film may be made by comparison with the tape. In order that various speeds of the cable may be selected, additional markings D may be placed on the tape which are either multiples or submultiples of the markings C. Thus, in the example shown in Figure 9, if the cable speed were reduced one-half, the markings C and D alternately would appear opposite the markings B.

Figure 10:
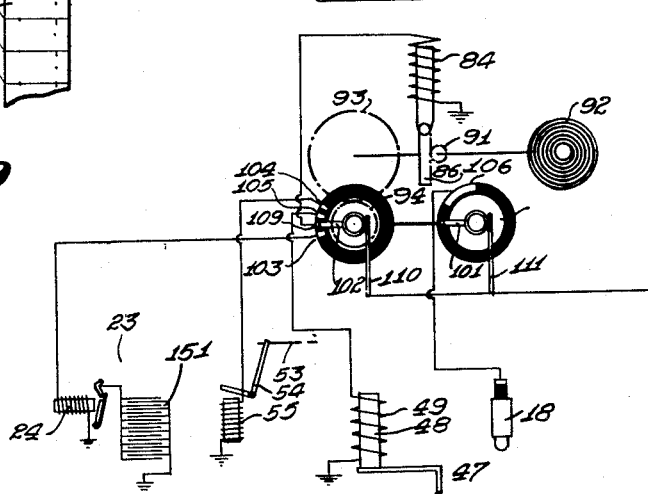
Figure 10 is another diagrammatical view showing a modified form of both the apparatus lowered within a wellbore and the surface control means.

Reference is now directed to Figure 10 in which a modified form of my apparatus is illustrated. The construction here illustrated is in most respects similar to the previously described structure, the essential difference being that the batteries are removed from the apparatus and incorporated in the surface equipment or equivalent source of electrical power supplied from the surface is used. In place of the electroscope charging battery 75 there is provided an electroscope charging condenser 151. In this connection, it should be noted that in either case a condenser or a high voltage low amperage battery may be employed as the charging means for the electroscope.

The remaining apparatus lowered within the wellbore is the same as previously described, except that sweeper arm 102 and associated brush and contacts may be omitted, and the cable conductor 6 is connected to brushes 110 and 111, and the operation selector solenoid contact 109 is engaged by sweeper arm 100, the contact being located between the charging magnet contact 103 and the film transport control solenoid contact 105.

At the surface the conductor 6 is connected through a selector mechanism to an operation selector 152 which is identical with the operation selector 4. For convenience the corresponding parts are given the same numbers as used in connection with the operation selector 4, with the added reference character a, that is, sweeper arms 100 and 100a, sweeper arms 101 and 101a correspond.

In addition, the operation selector 152 is provided with a dial pointer 153 driven by the sweeper arm shaft 95a. The dial pointer 153 coacts with a dial 154 to indicate the position of the sweeper arm.

The sheave wheel 121 operates through the Selsyn drive 138 and transmission 155 the timer wheel 156. The timer wheel is connected by a contact 157 and lead 158 to the solenoid 84a of the operation selector.

The transmission 155 enables the timer wheel 156 to rotate at any selected speed, with respect to movement of the sheave wheel, so that, for example, contact may be made for every five feet of travel of the cable or other selected distance. Assuming again a five-second cycle of operation for the operation selectors, it is merely necessary to raise the cable to a speed slightly less than five feet per five seconds, so that the cycle of operation is completed before contact is made through the timer wheel 156.

The various contacts, 103a to 106a, as well as 109a, are connected through a meter 148 to a source of electrical energy such as the batteries 159. Inasmuch as the corresponding contacts are engaged simultaneously by the sweeper arms of the two selectors, the meter 123 serves to indicate whether or not the parts controlled thereby are functioning properly.

It should be noted that the synchronization tape and associated mechanism shown in Figure 8 may be incorporated in the structure shown in Figure 10 so that the selectors are controlled by means responsive to time rather than the movement of the sheave wheel.

The apparatus herein disclosed may be utilized to measure the natural radiations or sub-atomic bombardment of the formation which it may traverse, or may measure the effects caused by artificial treating or activating formation by other means such as disclosed in the Bender patent, that is, the apparatus herein disclosed may be used in conjunction with a means for subjecting the formation to gamma rays, neutron bombardment, or other sub-atomic radiation or bombardment, such means being employed in timed unison with my apparatus or separately therefrom.

Various changes and alternate arrangements may be made within the scope of the appended claims, in which it is my intention to claim all novelty inherent in the invention as broadly as the prior art permits.

I claim:

1. A well logging apparatus comprising: a device sensitive to sub-atomic bombardment from the formation confronting the wellbore, said device including an element adapted to move in response to such bombardment; a recording camera having a predetermined exposure time interval and located in close proximity to said device and element for photographing the movement of said element; and means for correlating the record of said camera in terms of well depth.

2. An apparatus, as specified in claim 1, which is contained within a unitary housing adapted to be lowered into a wellbore, whereby said bombardment is both detected and recorded within said housing.

3. A well logging apparatus comprising: an electroscope, including an ionization chamber and an electroscope element sensitive to sub-atomic bombardment from the formation confronting the wellbore; a camera for photographing said electroscope element, said camera having a predetermined exposure time interval; means for periodically recharging said electroscope element; and means for determining the position of said electroscope in the well bore.

4. A well logging apparatus comprising: an ionization chamber; means associated with said chamber, including an element tending to move in response to sub-atomic bombardment from the formation confronting a wellbore; a camera for photographing said element, said camera having a predetermined exposure time interval; a housing structure including said chamber and enclosing said means and camera, said housing structure adapted to be moved as a unit through a wellbore; and means for correlating the photograph taken by said camera in terms of well depth.

5. A well logging apparatus comprising: a device sensitive to sub-atomic bombardment from the formation confronting the wellbore, said device including an element adapted to move in response to such bombardment; a recording camera in close proximity to said device and element for photographing the movement of said element, said camera having a predetermined exposure time interval; an electrically responsive operating means for said device and camera; a unitary housing for said device, camera and operating means; a conductor cable supporting said housing within a wellbore; instrumentalities at the outer end of said cable for controlling said operating means; and correlating the record of said camera in terms of well depth.

6. An apparatus for detecting variations in sub-atomic bombardment from the formation confronting a wellbore, comprising: means tending to move in response to sub-atomic bombardment and adapted to be positioned at different points along a wellbore; a multiple record camera for photographing said means at said points, said camera having a predetermined exposure time interval; and means for correlating said record in terms of well depth.

7. An apparatus for detecting variations in sub-atomic bombardment from the formation confronting a wellbore, comprising: a pressure-resistant housing; means for moving said casing along a wellbore; a device sensitive to sub-atomic bombardment incorporated in said housing and having an element tending to move in response to such bombardment; a camera also within said casing for photographically recording at different points along the wellbore the movement of said element, said camera having a predetermined exposure time interval; and means for correlating said record in terms of well depth.

8. An apparatus for detecting variations in sub-atomic bombardment from the formation confronting a wellbore, comprising: an ionization chamber; an electroscope means therein; means for magnifying the image of said electroscope; a multiple record camera for photographing said image; means for periodically charging said electroscope; a control means for said charging means and said camera, said control means having a cycle of operation wherein said electroscope is charged, and thereafter photographed by said camera; a housing for the several means and incorporating said chamber; means for moving said housing along a wellbore; and means for correlating the record of said camera in terms of well depth.

9. An apparatus for exploring variations in sub-atomic bombardment from formation confronting a wellbore, comprising: a housing adapted to be lowered into a wellbore; a device therein sensitive to sub-atomic bombardment, including an ionization chamber, an electroscope tending to discharge in response to said sub-atomic bombardment and means for charging said electroscope periodically; a camera for photographing said electroscope periodically; and means for correlating the record of said camera in terms of well depth.

10. An apparatus for exploring underground formations for the presence of radioactive bodies, comprising: a housing adapted to be lowered into a wellbore; an electroscope within said housing, said electroscope being sensitive to radiation from said radioactive bodies; means within said housing magnifying the image of said electroscope; means for charging said electroscope periodically; a camera within said housing for photographing said electroscope, said camera including a film and means for advancing the film through the camera, whereby a series of records of said electroscope may be made thereon; and apparatus for correlating the movement of said film in said camera with movement of said housing in the wellbore whereby the records on said film may be interpreted in terms of well depth.

11. An apparatus for exploring variations in sub-atomic bombardment from formation confronting a wellbore, comprising: a housing; a conductor cable for lowering said housing into a wellbore; a detector of sub-atomic bombardment within said housing; a recorder for said detector also contained within said housing and including a record strip adapted to advance as said recorder is operated; and means operable through said cable to correlate the rate of movement of said record strip with the rate of movement of said housing through the wellbore, whereby said record strip may be interpreted in terms of well depth.

12. An apparatus for exploring variations in sub-atomic bombardment from formation confronting a wellbore, comprising: a detector of sub-atomic bombardment including an ionization chamber, an electroscope therein and means for charging said electroscope periodically, said electroscope tending to discharge when subject to said sub-atomic bombardment; means for recording movement of said electroscope, including a record strip adapted to be advanced periodically; a housing for said detector and recording means; a cable for supporting said housing; a timer for controlling said charging means recorder and movement of said record strip; and means operating through said timer for correlating the movement of said record strip with movement of said housing within a wellbore, whereby the record strip may be interpreted in terms of well depth.

13. An apparatus for exploring variations in sub-atomic bombardment from formations confronting a wellbore, comprising: a self-contained detector of sub-atomic bombardment and recorder therefor adapted to be moved as a unit within a wellbore; said detector including an indicating element adapted to be photographed; and said recorder including a camera and photographic film, said camera having a predetermined exposure time interval and means comprising cooperative elements located in said detector and at the earth's surface for correlating the movement of said photographic film in terms of well depth.

14. A method of exploring a wellbore to detect sub-atomic bombardment from formation confronting a wellbore, characterized by: subjecting an electroscope to such bombardment; periodically charging the electroscope; photographically recording on a record strip the movement of said electroscope occurring during a predetermined interval after charging said electroscope; and correlating said record strip in terms of well depth.

15. A method of exploring a wellbore to detect sub-atomic bombardment from formation confronting a wellbore, characterized by: subjecting an electroscope to such bombardment; periodically charging the electroscope; photographically recording on a record strip the movement of said electroscope occurring during a predetermined interval after charging said electroscope; advancing the record strip a predetermined amount after each record; causing said electroscope to travel along a wellbore during its operation; and correlating the travel of said electroscope with the record strip, whereby the record strip may be interpreted in terms of well depth.

16. A wellbore logging apparatus comprising: a device sensitive to a property of the formation confronting a wellbore, including an indicator adapted to move in response to changes in said property; a camera adapted to photograph said indicator periodically and including a film and means for advancing said film whereby a series of records may be made along the film; a unitary housing for said device and camera; a conductor cable for moving said housing along a wellbore; and electrical means, including an element actuated by movement of said cable, for controlling the advance of said film in correlation with movement of said housing along the wellbore, whereby the record on said film may be interpreted in terms of well depth.

17. The combination with a recording instrument adapted to be lowered by a conductor cable into a well bore for recording conditions therein at different levels, of means for correlating the record of said instrument in terms of well depth, comprising: an actuator incorporated in said instrument for causing a predetermined cycle of operation of said instrument; and apparatus at the well surface and electrically associated with said instrument through said conductor cable, including means for indicating completion of a cycle of operation, means for controlling said actuator to cause repetition of said cycle of operation, and means for indicating the position of said instrument in the well bore.

18. The combination with a recording instrument adapted to be lowered by a conductor cable into a well bore for recording conditions therein at different levels, of means for correlating the record of said instrument in terms of well depth, comprising: an actuator incorporated in said instrument for causing a predetermined cycle of operation of said instrument; a recording device at the surface of the well bore for indicating movement of said cable; and means operatively connected with said recording instrument and recording device for indicating on said recording device completion of each cycle of operation.

19. The combination with a recording instrument adapted to be lowered by a conductor cable into a well bore for recording conditions therein at different levels, of means for correlating the record of said instrument in terms of well depth, comprising: a pair of sequencing switches, one incorporated in said instrument, the other at the well surface; a source of electrical energy connected with said instrument through both of said switches in series; means for actuating said switches in unison; and means responsive to movement of said cable for controlling said actuating means.

JAMES C. ARNOLD.